J. B. DOOLITTLE.
Screw-Cutting Dies.
No. 150,140. Patented April 28, 1874.
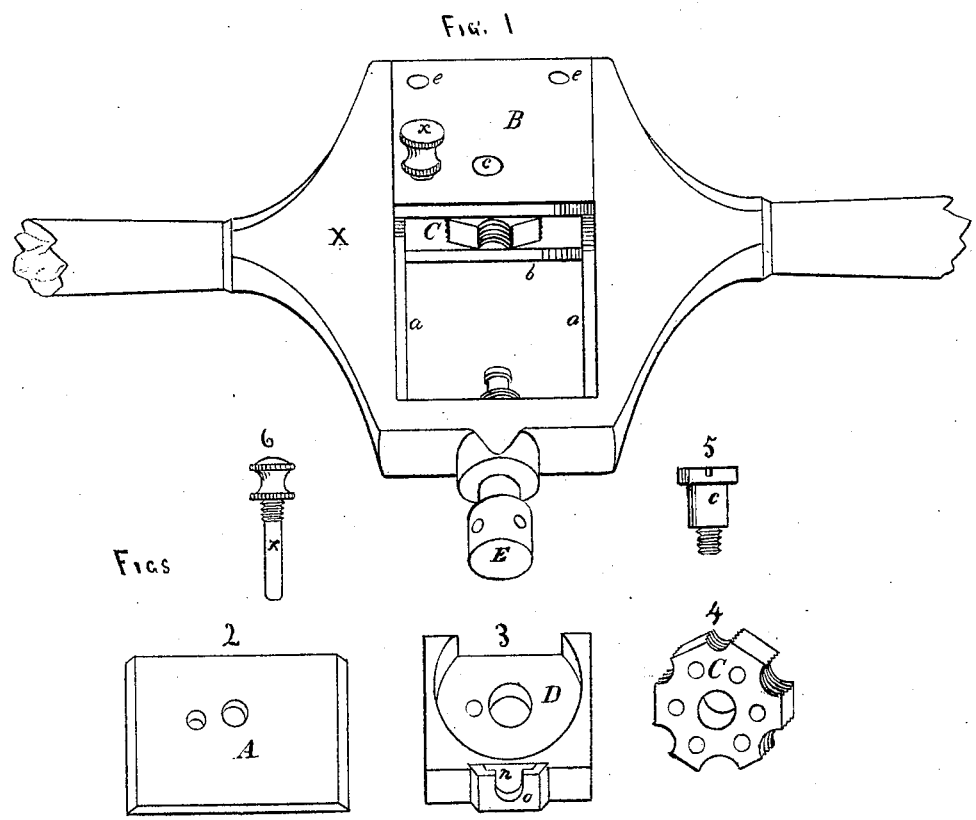
WITNESSES
Roger M. Sherman
Joseph M. Russell
INVENTOR,
James B. Doolittle
by his Attorney
George Perry

UNITED STATES PATENT OFFICE.

JAMES B. DOOLITTLE, OF WALLINGFORD, CONNECTICUT.

IMPROVEMENT IN SCREW-CUTTING DIES.

Specification forming part of Letters Patent No. 150,140, dated April 28, 1874; application filed March 26, 1874.

*To all whom it may concern:*

Be it known that I, JAMES B. DOOLITTLE, of the town of Wallingford, in the county of New Haven and State of Connecticut, have invented certain Improvements in Screw-Plates, of which the following is a specification:

My invention relates to that class of screw-plates provided with two revolving dies, one of which is stationary, and the other moved to and from it by a screw; and consists in the combination and arrangement of parts, as hereinafter more fully set forth and claimed.

In the drawing, letters of the same name and kind indicate like parts.

To enable others skilled in the art to make and use my invention, I will proceed to describe the construction and operation of my plate and dies.

The plate itself, X, differs from an ordinary plate in not having V-shaped or round skeins or ways on which the dies slide and are held in the plate. It differs, also, in that the portion b, corresponding in size and shape to the slide B, is a part of the plate. On two of the inner edges of the side of the plate (shown in the drawing) dovetailed depressions a a are planed out, for holding the slides A and B. In other respects my plate is like ordinary screw-plates.

I make my dies exactly alike, and circular or many-sided, with a hole through the center large enough for the insertion of a screw or pin of sufficient size to hold all the strain that comes on the dies C C. On this pin the dies are free to turn or revolve. I make in the dies, also, small holes equidistant from the center and from each other. The pin x passes through the slide A, into which it screws through these small holes in the die, and into the rectangular piece D, and holds the die in its proper position. A like pin, x, passes through the slide B, into which it screws, and, through the die, into the plate, for a like purpose.

In the case of circular dies, I make in their circumferences threaded semicircular slots, or threaded slots less than a semicircle, the centers of which are equidistant apart, of any size required, and having any number of threads required to the inch.

The form of die that I prefer is a die having six equal sides, and having the threaded slots in the angles made by the meeting of the sides, as shown in Fig. 4. The reasons of my preference are, that this form of die presents the best cutting-edges, and the sides can be ground, and the edges kept sharp. Strictly speaking, the sides in these dies are not equal, because the threaded slots are not the same size; but this description will be correctly understood.

These dies are so arranged in the plate that the slots, having corresponding threads, must, by turning the dies and the pins x x, hold them firmly in position.

The rectangular piece D, Fig. 3, is countersunk to admit the die C, and has a hole, through which the pin c, on which the die turns, passes, and also a small hole, through which the pin x is passed. The countersink is made nearest to one side, so that the die C projects beyond the piece D. The piece D also has a piece, o, attached to it, with an open slot, n, narrowest on the outside, and rounded on the bottom. The screw E has a groove turned in it on its inner end, and the groove fits into the slot n, so that the piece D and the die within it are moved when the screw E is turned either way.

Instead of a separate piece having a slot, the slot may be made in the piece D.

Fig. 2 shows the slide A with dovetailed ends and threaded holes, into which the pins c and x screw. Fig. 5 shows the screw or headed pin c, with one end turned down and threaded, which screws into the slide A. A corresponding pin passes through the other die, the end of which appears at e. Fig. 6 shows the pins x x. Through the slide B two pins, e e, pass into the plate, and securely hold the slide.

I claim as my invention—

The improved screw-plate x, having the dovetailed slots a a, and provided with the slides A and B, in combination with the revolving dies C C, and with the piece D, as set forth.

JAMES B. DOOLITTLE.

Witnesses:
GEORGE TERRY,
JULIUS FREISS.